O. OLSSON.
BELT SANDER.
APPLICATION FILED APR. 26, 1909.
938,692.
Patented Nov. 2, 1909.
2 SHEETS—SHEET 2.
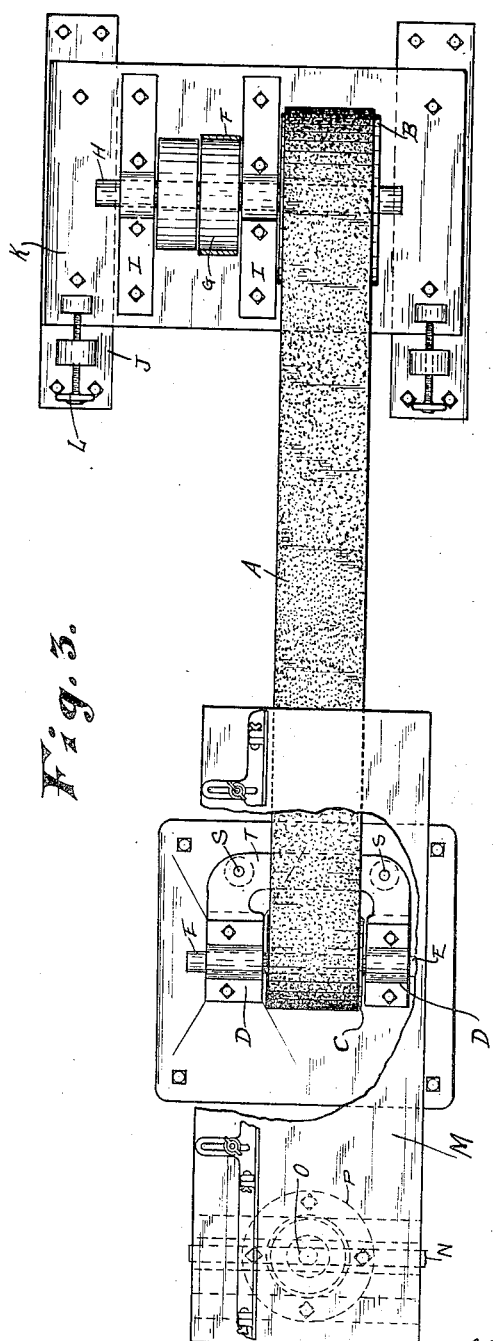
Witnesses
Inventor
Oscar Olsson
By
Erwin & Wheeler
Attorneys

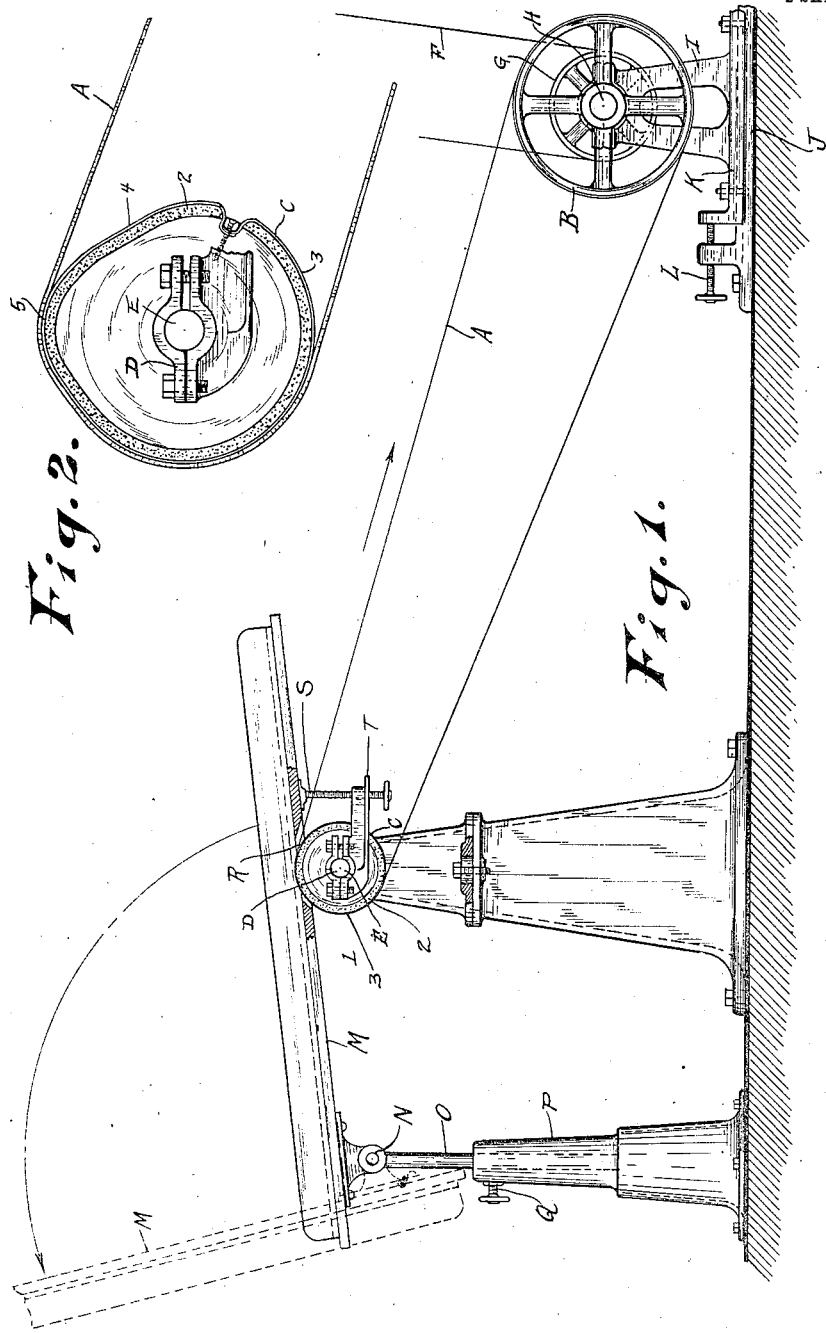

UNITED STATES PATENT OFFICE.

OSCAR OLSSON, OF MILWAUKEE, WISCONSIN.

BELT-SANDER.

938,692.

Specification of Letters Patent.   Patented Nov. 2, 1909.

Application filed April 26, 1909.   Serial No. 492,324.

*To all whom it may concern:*

Be it known that I, OSCAR OLSSON, a citizen of the United States, residing at Milwaukee, county of Milwaukee, and State of Wisconsin, have invented new and useful Improvements in Belt-Sanders, of which the following is a specification.

My invention relates to improvements in belt sanders.

Heretofore, so far as I am aware, devices of this kind have been constructed in which the belt was passed around rollers or drums at its respective ends, one of the rollers being wound with soft flexible material, such as felt, and serving as a yielding support for the abrading belt during the sanding operation, the work being held against the portion of the belt supported by the roller. In such devices, it is impossible to maintain a true cylindrical roller surface, owing to the fact that the felt or other packing material tends to shift its position, forming ridges and depressions, so that the surface of the roller quickly becomes eccentric and it is then impossible to properly finish a wooden surface with absolute uniformity. The vibrations produced by the uneven surface of the roller cause the belt to alternately approach and recede from the work.

The object of my invention is to provide a form of construction in which an abrading belt will be supported by a stationary member in such a manner that it will bear upon the surface of the work with absolute uniformity.

In the following description, reference is had to the accompanying drawings, in which—

Figure 1 is a side elevation of a belt sander embodying my invention. Fig. 2 is a detail side view, showing the end of the stationary supporting member in its relation to the belt. Fig. 3 is a plan view of the machine shown in Fig. 1.

Like parts are identified by the same reference characters throughout the several views.

The belt A has its outer surface covered with abrasive material. It is an endless belt and extends over a rotary drum or cylinder B and around a supporting member C, which is rigidly secured in suitable end bearings D, whereby it is held from rotating, these bearings consisting of clamping members bolted together, as shown, in a manner to firmly grip the end projections E on the member C. The member C is preferably formed of an interior core piece of wood or other suitable material covered by a layer of flexible material 2, such as felt, and this in turn is covered by a layer 3 of canvas or other flexible material, adapted to serve as an outer surface for the member, over which the belt A travels. Power is applied to the cylinder B through a driving belt F and pulley G. The shaft H is supported by standards I, which are shiftable along the bed J, these standards having base members K slidably mounted upon the bed and adjusted by means of screws L.

The work is supported upon a table M, pivotally supported at N by vertically adjustable posts O socketed in the standards P, set screws Q being employed to hold the posts in any desired position of vertical adjustment. The table M is slotted at R to permit an exposure of the upper surface of the belt A in contact with the work supported by said table. The surface 3 of the member C is coated with paraffin, or other suitable material, adapted to reduce the friction of the belt A thereon, the inner surface of the belt A being similarly covered with an anti-friction coating.

The table M may be swung upon its pivotal support either to wholly remove it from the belt or to adjust it in various positions with reference thereto. In the latter case, it is supported in the desired position by means of the vertically disposed screws S carried by the bracket T. The table being thus adjustable and the member C non-rotatable, it is possible to give to said member C an eccentric form adapting it for different classes of work. For example, in Fig. 2, this member C is illustrated with a flat surface 4 and a portion 5 extending outwardly in the form of a rounded rib or cam projection, the remaining portion of the surface of the member C being cylindrical in form. By releasing the end clamping members D, the member C may be adjusted to bring any desired portion of the member C into registry with the slot in the table M and if desired, different tables may be substituted, each having a slot R proportioned to the width of the surface of the member C in registry therewith.

With the described construction, it is obvious that the belt A will travel over the surface of the supporting member C with absolute regularity in its movement and without any vertical movement of vibration such as would be caused by a revolving roller having an eccentric or uneven surface.

Having thus described my invention, what I claim as new, and desire to secure by Letters Patent, is—

1. The combination with a revolving driving cylinder and a stationary supporting member surfaced with flexible material, of an inclined endless tension belt extending about said driving and supporting members and provided with an abrasive surface, said driving and supporting members having horizontal axes.

2. The combination with a revolving driving cylinder and a stationary supporting member surfaced with flexible material, of an endless belt extending about said driving and supporting members and provided with an abrasive surface, and an adjustable table partially covering the supporting member and having a slot through which said belt may be exposed.

3. The combination with a revolving driving cylinder and a stationary supporting member surfaced with flexible material, of an endless belt extending about said driving and supporting members and provided with an abrasive surface, and adjustable means for supporting material to be polished against the surface of the belt where it passes over said supporting member, said supporting member having its outer surface eccentrically formed and said member being rotatably adjustably to bring different portions of its surface in registry with the work.

4. The combination with a revolving driving cylinder and a stationary supporting member surfaced with flexible material, of an endless belt extending about said driving and supporting members and provided with an abrasive surface, and adjustable means for supporting material to be polished against the surface of the belt where it passes over said supporting member, the contacting surfaces of the supporting member and belt being surfaced with anti-friction material.

In testimony whereof I affix my signature in the presence of two witnesses.

OSCAR OLSSON.

Witnesses:
   LEVERETT C. WHEELER,
   CARL RUNGE.